D. W. HARRIS.
GRAIN THRESHER.
No. 7,666.
Patented Sept. 24, 1850.
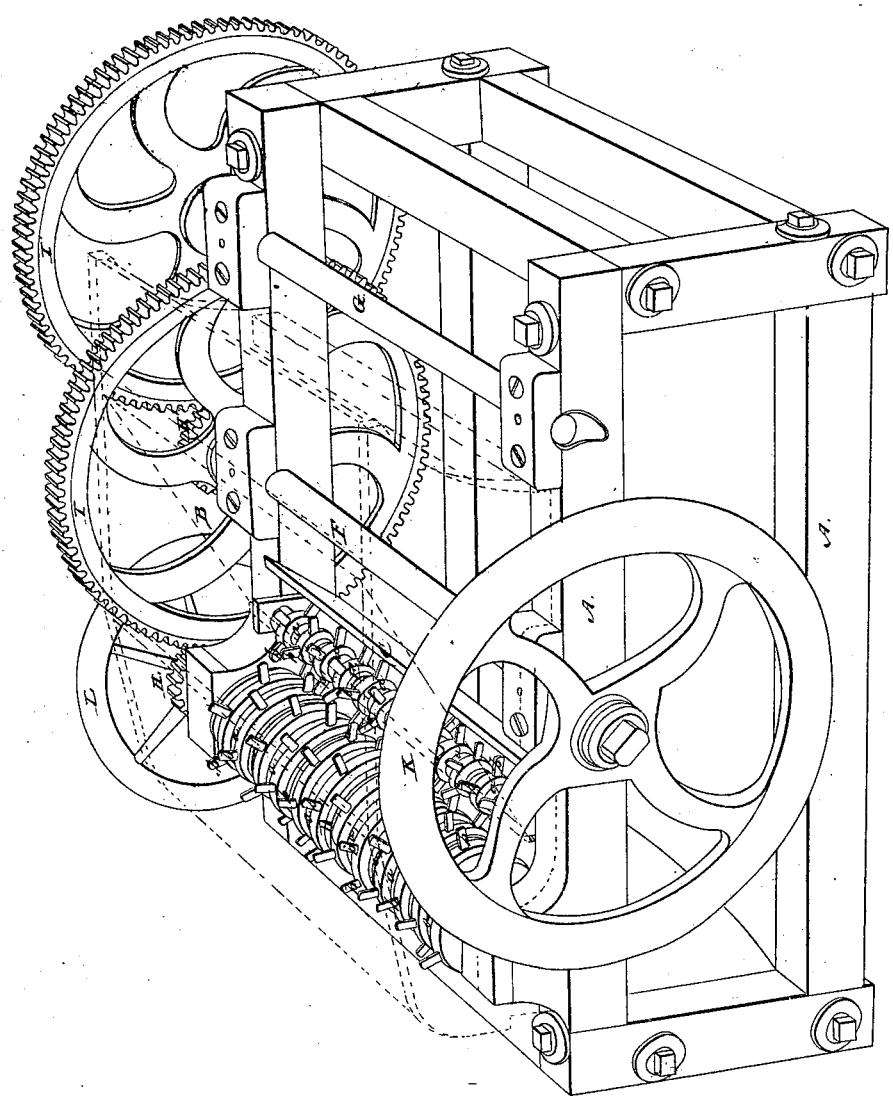

UNITED STATES PATENT OFFICE.

D. W. HARRIS, OF YORKSHIRE, NEW YORK.

CONSTRUCTION OF THRESHING-MACHINES.

Specification of Letters Patent No. 7,666, dated September 24, 1850.

*To all whom it may concern:*

Be it known that I, DARIUS W. HARRIS, of Yorkshire, in the county of Cattaraugus and State of New York, have invented certain new and useful Improvements in Threshing-Machines which are Applicable Either to Those Moved by Hand or by Power; and I do hereby declare that the following is a full, clear, and exact description of my invention, reference being had to the accompanying drawing, which forms part of this specification and represents a view in perspective of my machine.

My invention consists, first, in dispensing with what is usually termed the concave and in substituting a toothed cylinder in its place; second, in constructing the toothed cylinders of annular sections which are arranged upon shafts in such manner that when the teeth of any one section meet with an obstruction which they can not break that section ceases to revolve while the others continue to act.

In the accompanying drawing A is the frame of the machine constructed of suitable timbers framed together and secured to each other by bolts; this frame supports the feed board B upon which the unthreshed grain is fed, and the apron C, by which the threshed grain is discharged; it also supports the threshing cylinders D, E, and the gearing by which they are driven at the requisite speed. The threshing cylinders are, in this example, three in number (two only being visible in the drawing), the one D is driven, while the other E remains stationary or only turns by the friction of the straw passing through the machine. Either one or both of these cylinders are constructed of annular sections *a*, *a*, arranged upon a shaft to which either all or each alternate section is secured by friction alone; if alternate sections of each cylinder are secured by friction while the remaining ones are rigidly fixed to their respective shafts, the fast sections of one cylinder must be placed opposite to the loose sections of the other. Each section is studded with teeth *b* which effect the threshing of the grain. The driven cylinder D has a pinion H secured to one of the extremities of its shaft which engages with the teeth of a cog wheel I, on a counter shaft F, the latter is also fitted with a pinion H' which meshes into a cog wheel I' on the driving shaft G, to which the power of the prime mover is applied; if the machine is to be operated by hand, the power is most conveniently applied through the intervention of a crank secured to one of the extremities of the driving shaft, if steam, water or horse power be employed, the power is conveniently applied through the intervention of a belt, encircling a belt pulley secured to the driving shaft. In order that all parts of the machine may work with the requisite regularity I attach a fly wheel K to the counter-shaft F and a smaller one L to that of the threshing cylinder D; these prevent the backlash which frequently takes places in threshing machines and enable me to drive my machine with a regularity hitherto unattainable.

When the machine is in operation the opened sheaves of grain are presented to the machine upon the feed board and being entered between the toothed cylinders are effectually threshed; the threshed grain and straw are discharged by the apron. If a stone or any similar substance too large to pass between the teeth be accidentally introduced with the grain, the annular section of that tooth which strikes the obstruction being secured to its shaft by friction alone, ceases to revolve thus preventing the breakage of the teeth, while the other sections still continue to act. It is therefore evident that this method of constructing threshing cylinders consitutes an effectual safeguard against the breakage of the machine, while at the same time the friction of the sections on their shafts together with the momentum accumulated by them and the fly wheels is sufficient to carry through any accidental overcharge of unthreshed grain which would otherwise affect the regular motion of the prime mover.

What I claim as my invention and desire to secure by Letters Patent is—

The threshing cylinders constructed of fast and loose sections the fast sections of one cylinder being opposite the loose sections of another substantially as herein set forth.

In testimony whereof I have hereto subscribed my name.

D. W. HARRIS.

Witnesses:
   E. S. RENWICK,
   D. W. HARRIS.